J. R. Brown,
Box Scraper.
No. 108,321. Patented Oct. 18. 1870.
Fig. 1.
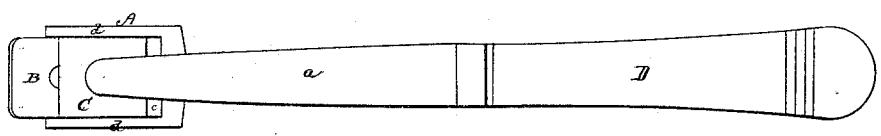
Fig. 2.
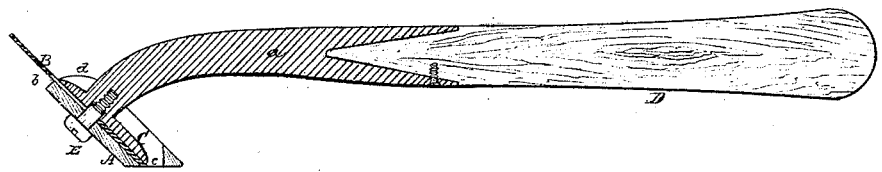
Fig. 3.
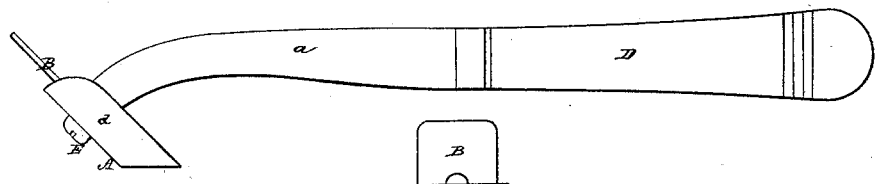
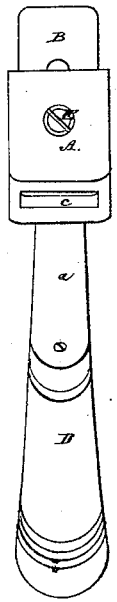
Fig. 4.
Witnesses
S. N. Piper
L. N. Allen
James R. Brown
by his attorney
R. H. Eddy

United States Patent Office.

JAMES RICHARDSON BROWN, OF CAMBRIDGEPORT, MASSACHUSETTS.

Letters Patent No. 108,321, dated October 18, 1870; antedated October 1, 1870.

IMPROVEMENT IN BOX-SCRAPERS.

The Schedule referred to in these Letters Patent and making part of the same.

*To all persons to whom these presents may come:*

Be it known that I, JAMES RICHARDSON BROWN, of Cambridgeport, of the county of Middlesex and State of Massachusetts, have made a new and useful invention having reference to Box-Scrapers; and do hereby declare the same to be fully described in the following specification, reference being had to the accompanying drawing making part thereof.

Of such drawing—
Figure 1 is a top view;
Figure 2, a longitudinal section;
Figure 3, a side elevation; and
Figure 4, a front end view of one of my improved scrapers.

This scraper, though somewhat analogous to that for which Letters Patent No. 86,741 were granted February 9, 1869, to William Dutton, of Boston, of the State of Massachusetts, yet differs materially therefrom, inasmuch as in my improved scraper there is a cap to the cutter, and such cap is united to the handle; whereas, in the scraper of Dutton, there is no such cap.

The said cap is to perform the function of the cap-iron of a joiner's plane.

Furthermore, in my scraper the screw by which the cutter is held in place goes through the stock and the cutter, and screws up into the shank of the handle, the same admitting of the screw being made much longer and stronger than the screw as used in the scraper of Dutton, as such screw simply goes through the cutter, and the stock receives a lever-nut on the outside of the stock.

The lever-nut, owing to its position, is liable to derangement, but in my scraper the screw-head is on the outside of the stock, and there is no nut required to hold the cutter to the stock.

The screw in my scraper confines the stock and cutter together, and to the cap and handle.

In the drawing—
A denotes the stock;
B, the cutter;
C, the cap;
D, the handle; and
*a*, the shank of such handle.

The stock is formed with a bearing-surface, *b*, having a throat, *c*, made through it, such bearing-surface being arranged at an obtuse angle with the front face of the stock.

From the inner face of the stock two lips, *d d*, project parallel to each other. They serve as guides and supports for the cutter or plane-iron B, which is disposed between them and in the throat, in manner as represented.

The cap C is in one piece with or directly attached to the shank *a* of the handle.

The screw for connecting the stock to the cap and handle, and confining the cutter between them is represented at E. It goes through a hole in the stock, and also through a slot in the cutter, and screws into the cap and the shank, they serving to strengthen the connection of the said cap and shank, besides accomplishing other duties, as hereinbefore stated.

I make no claim to the subject of the aforesaid patents; nor do I claim a box-scraper made as represented in the United States patent numbered 41,571, or as represented in the specification and drawings of Henry, Joseph, and Thomas H. Belcher's application for a patent, filed in the Patent Office June 6, 1862.

In the scraper of the patent 41,571, the mouthed stock and the handle are in one piece of metal, and the cutter is held by a clamp-plate, which in no respect performs, with the cutter, the office of a "cap-iron," to turn the shaving and act in other respects like the cap-iron of a joiner's plane, as does the cap C of my implement.

In the said Belcher's scraper there is no mouthed stock, as in mine, and no cap-iron, the cutter being held in place by a screw projected from the shank of the handle, and having a nut screwed on it.

The screw of my scraper goes through the stock and into the cap and shank, which is not the case with that of the said Belcher's scraper.

What I claim as of my invention, in the improved scraper hereinbefore explained, is as follows:

The arrangement, as described, of the cap C, projected from the shank *a*, the stock A, provided with the mouth *c*, and made separate from the cap C, the cutter B and the screw E, the said parts, with the handle, constituting an improved box-scraper, for use as specified.

JAMES RICHARDSON BROWN.

Witnesses:
   R. H. EDDY,
   J. R. SNOW.